(12) United States Patent
Choi et al.

(10) Patent No.: US 11,512,152 B2
(45) Date of Patent: Nov. 29, 2022

(54) METHOD OF PREPARING ACRYLIC ADHESIVE AND ADHESIVE FILM PREPARED THEREFROM

(71) Applicant: LG Chem, Ltd., Seoul (KR)

(72) Inventors: Jun Man Choi, Daejeon (KR); Sang Hwan Kim, Daejeon (KR); Jang Soon Kim, Daejeon (KR); Kwang Su Seo, Daejeon (KR); Won Gu Choi, Daejeon (KR); Chi Gwan An, Daejeon (KR)

(73) Assignee: LG Chem, Ltd.

( * ) Notice: Subject to any disclaimer, the term of this patent is extended or adjusted under 35 U.S.C. 154(b) by 572 days.

(21) Appl. No.: 16/481,154

(22) PCT Filed: Feb. 27, 2018

(86) PCT No.: PCT/KR2018/002355
§ 371 (c)(1),
(2) Date: Jul. 26, 2019

(87) PCT Pub. No.: WO2018/155989
PCT Pub. Date: Aug. 30, 2018

(65) Prior Publication Data
US 2019/0338165 A1 Nov. 7, 2019

(30) Foreign Application Priority Data
Feb. 27, 2017 (KR) .................. 10-2017-0025367

(51) Int. Cl.
| | | |
|---|---|---|
| C09J 125/18 | (2006.01) |
| C08F 2/06 | (2006.01) |
| C08F 2/38 | (2006.01) |
| C08F 6/00 | (2006.01) |
| C08F 212/14 | (2006.01) |
| C08F 212/32 | (2006.01) |
| C08K 5/37 | (2006.01) |
| C09J 4/06 | (2006.01) |
| C08F 220/18 | (2006.01) |
| C08F 220/30 | (2006.01) |
| C08F 2/46 | (2006.01) |

(52) U.S. Cl.
CPC .............. C08F 2/38 (2013.01); C08F 2/06 (2013.01); C08F 2/46 (2013.01); C08F 220/18 (2013.01); C08F 220/1808 (2020.02); C08F 220/301 (2020.02); C08K 5/37 (2013.01); C09J 4/06 (2013.01); C08F 6/003 (2013.01); C08F 212/22 (2020.02); C08F 212/32 (2013.01); C08F 220/1811 (2020.02); C08F 220/303 (2020.02); C09J 125/18 (2013.01); C09J 2301/416 (2020.08)

(58) Field of Classification Search
None
See application file for complete search history.

(56) References Cited

U.S. PATENT DOCUMENTS

| | | | |
|---|---|---|---|
| 5,026,806 A * | 6/1991 | Rehmer | C09J 133/062 |
| | | | 522/90 |
| 2011/0319514 A1 | 12/2011 | Breiner et al. | |
| 2012/0077721 A1 | 3/2012 | Dolmazon et al. | |
| 2012/0328800 A1 | 12/2012 | Yoon et al. | |
| 2013/0005909 A1 | 1/2013 | Natsui et al. | |
| 2013/0177758 A1 | 7/2013 | Shigetomi et al. | |
| 2015/0291853 A1 | 10/2015 | D'Haese et al. | |
| 2016/0068719 A1 | 3/2016 | Sato et al. | |
| 2016/0312080 A1 | 10/2016 | Richter et al. | |
| 2018/0057715 A1 | 3/2018 | Lee et al. | |

FOREIGN PATENT DOCUMENTS

| | | |
|---|---|---|
| CN | 103097483 A | 5/2013 |
| CN | 104334662 A | 2/2015 |
| JP | H02170884 A | 7/1990 |
| JP | H03217477 A | 9/1991 |
| JP | H06299132 A | 10/1994 |
| JP | 2006144014 A | 6/2006 |
| JP | 2008050590 A | 3/2008 |
| JP | 2012233060 A | 11/2012 |
| JP | 5348343 B1 | 11/2013 |
| JP | 5639448 B2 | 12/2014 |
| JP | 2016501290 A | 1/2016 |
| KR | 20060055755 A | 5/2006 |
| KR | 100855634 B1 | 9/2008 |
| KR | 20110088973 A | 8/2011 |
| KR | 20110098692 A | 9/2011 |
| KR | 20120001733 A | 1/2012 |
| KR | 20120002597 A | 1/2012 |
| KR | 20120118208 A | 10/2012 |
| KR | 20130046972 A | 5/2013 |
| KR | 20130106376 A | 9/2013 |

(Continued)

OTHER PUBLICATIONS

English translation of International Search Report for PCT/KR2018/002355 dated Jun. 7, 2018 (Year: 2018).*

(Continued)

*Primary Examiner* — Richard A Huhn
(74) *Attorney, Agent, or Firm* — Lerner, David, Littenberg, Krumholz & Mentlik, LLP

(57) ABSTRACT

A method of preparing an acrylic adhesive, in which the durability of an adhesive film may be improved through additional photocuring and the residual components according to solution photopolymerization are efficiently removed, and an adhesive film prepared therefrom.

10 Claims, No Drawings

(56) References Cited

FOREIGN PATENT DOCUMENTS

| KR | 20160015474 A | 2/2016 |
|---|---|---|
| KR | 101612161 B1 | 4/2016 |
| KR | 20160099608 A | 8/2016 |
| KR | 20170012630 A | 2/2017 |
| KR | 20170082191 A | 7/2017 |
| WO | 2016093206 A1 | 6/2016 |

OTHER PUBLICATIONS

Chinese Search Report for Application No. 201880011919.7, dated Sep. 7, 2020 pp. 1-3.
International Search Report for PCT/KR2018/002355 dated Jun. 7, 2018.

* cited by examiner

METHOD OF PREPARING ACRYLIC ADHESIVE AND ADHESIVE FILM PREPARED THEREFROM

CROSS-REFERENCE TO RELATED APPLICATIONS

This application is a national phase entry under 35 U.S.C. § 371 of International Application No. PCT/KR2018/002355, filed Feb. 27, 2018, which claims priority to Korean Patent Application No. 10-2017-0025367, filed Feb. 27, 2017, the disclosures of which are incorporated herein by reference.

TECHNICAL FIELD

The present specification relates to a method of preparing an acrylic adhesive composition which can be additionally photocured and from which a solvent, a residual chain transfer agent, and a residual photopolymerization initiator are removed, and an adhesive film prepared therefrom.

BACKGROUND ART

Acrylic resins have been used in order to improve adhesion strength of an adhesive film to an adherend and secure transparency, in the field of optical clear adhesive. However, since an acrylic resin prepared by the existing polymerization method has a weight average molecular weight of several hundred thousands to several millions, which is relatively high, and an insufficient initial adhesive strength, there was a problem in that the acrylic resin is applied to an adhesive.

Thus, in order to prepare a low molecular weight acrylic resin, a bulk photopolymerization method including no separate solvent is used, but the method had a problem in that it is difficult to control heat generation caused by a polymerization reaction. Further, when a low molecular weight acrylic resin is prepared through a solution heat polymerization method, there was a problem with safety such as explosion due to a sharp increase in reaction heat.

Thus, a method of preparing a low molecular weight acrylic resin using a solution photopolymerization method was attempted. However, even in this case, the used solvent remains, adhesion properties of the low molecular weight acrylic resin deteriorate due to a chain transfer agent added for a polymerization, and a phenomenon such as yellowing occurs, so that it was difficult to apply the low molecular weight acrylic resin to an optical clear adhesive.

Aside from this, when an adhesive film is prepared by curing an adhesive including an acrylic resin, there was a problem in that the durability deteriorates. Furthermore, when the adhesive film is attached to a member having a printing step, there was a problem in that the printing step cannot be sufficiently buried through an additional curing without a separate curing agent.

Thus, there is a need for studies on an acrylic adhesive which can be prepared using a solution photopolymerization method, can provide an adhesive film capable of being additionally cured without a separate curing agent, and can be applied to an optical clear adhesive because the residual components are removed.

REFERENCES OF THE RELATED ART

Patent Document

Korean Patent Application Laid-Open No. 10-2012-0002597

DETAILED DESCRIPTION OF THE INVENTION

Technical Problem

The present invention has been made in an effort to provide a method of preparing an acrylic adhesive including a low molecular weight acrylic resin, which can be additionally photocured without a separate curing agent, and can provide a clear adhesive film.

However, a technical problem to be solved by the present invention is not limited to the aforementioned problem, and the other problems that are not mentioned may be clearly understood by the person skilled in the art from the following description.

Technical Solution

An exemplary embodiment of the present invention provides a method of preparing an acrylic adhesive, the method comprising: preparing a solution including a low molecular weight acrylic resin by solution photopolymerization of a mixture including a (meth)acrylate-based monomer, a photoreactive functional group-containing (meth)acrylate-based monomer, a chain transfer agent, and a solvent; and mixing the solution including the low molecular weight acrylic resin with a monomer for dilution, and then reducing pressure to remove the solvent and any residual chain transfer agent, wherein the photoreactive functional group-containing (meth)acrylate-based monomer is comprised in the mixture in an amount of 0.1 part by weight or more to 10 parts by weight or less based on 100 parts by weight of the (meth)acrylate-based monomer.

An exemplary embodiment of the present invention provides an adhesive film including a cured product of the acrylic adhesive prepared by the preparation method.

Advantageous Effects

The adhesive prepared according to an exemplary embodiment of the present invention may be applied to a member with a printing step without a separate curing agent by including a low molecular weight acrylic resin which can be additionally photocured, thereby providing a clear adhesive film which can efficiently bury the printing step.

According to an exemplary embodiment of the present invention, there is an advantage in that through a solution photopolymerization method, heat generation caused by a polymerization reaction into a low molecular weight acrylic resin is easily controlled.

According to an exemplary embodiment of the present invention, it is possible to prepare an acrylic adhesive capable of implementing various physical properties such as weatherability and light resistance by minimizing the contents of the solvent and the residual chain transfer agent, which are present in the acrylic adhesive after a polymerization reaction.

BEST MODE

When one part "includes" one constituent element in the present specification, unless otherwise specifically described, this does not mean that another constituent element is excluded, but means that another constituent element may be further included.

In the present specification, the "(meth)acrylate" means acrylate or methacrylate.

An exemplary embodiment of the present invention provides a method of preparing an acrylic adhesive, the method including: preparing a solution including a low molecular weight acrylic resin by solution photopolymerization of a mixture including a (meth)acrylate-based monomer, a photoreactive functional group-containing (meth)acrylate-based monomer, a chain transfer agent, and a solvent; and removing the solvent and the residual chain transfer agent by mixing the solution including the low molecular weight acrylic resin with a monomer for dilution, and then reducing pressure, in which the photoreactive functional group-containing (meth)acrylate-based monomer is included in the mixture in an amount of 0.1 part by weight or more to 10 parts by weight or less based on 100 parts by weight of the (meth)acrylate-based monomer.

According to an exemplary embodiment of the present invention, the (meth)acrylate-based monomer may include at least one of an alkyl group-containing (meth)acrylate-based monomer, a cycloalkyl group-containing (meth)acrylate-based monomer, and a polar functional group-containing (meth)acrylate-based monomer.

In the present specification, an alkyl group may include a carbon chain structure in which an unsaturated bond is not present in a functional group, and specifically, may include a straight-chained or branched carbon chain structure having 1 to 20 carbon atoms.

According to an exemplary embodiment of the present invention, the alkyl group-containing (meth)acrylate-based monomer may be one or more monomers selected from the group consisting of methacrylate, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, and isooctyl (meth)acrylate, but is not limited thereto.

In the present invention, the cycloalkyl group may include a carbon ring structure in which an unsaturated bond is not present in the functional group, and specifically, may include a monocyclic ring or a polycyclic ring, which has 3 to 20 carbon atoms.

According to an exemplary embodiment of the present invention, the cycloalkyl group-containing (meth)acrylate-based monomer may be one or more monomers selected from the group consisting of cyclohexyl acrylate (CHA), cyclohexyl methacrylate (CHMA), isobornyl acrylate (IBOA), isobornyl methacrylate (IBOMA), and 3,3,5-trimethylcyclohexylacrylate (TMCHA), but is not limited thereto.

According to an exemplary embodiment of the present invention, the polar functional group-containing (meth)acrylate-based monomer may include at least one monomer of a hydroxyl group-containing (meth)acrylate-based monomer, a carboxyl group-containing (meth)acrylate-based monomer, and a nitrogen-containing (meth)acrylate-based monomer.

According to an exemplary embodiment of the present invention, the hydroxyl group-containing (meth)acrylate-based monomer may be one or more monomers selected from the group consisting of 2-hydroxyethyl (meth)acrylate, 2-hydroxypropyl (meth)acrylate, 4-hydroxybutyl (meth) acrylate, 6-hydroxyhexyl (meth) acrylate, 8-hydroxyoctyl (meth)acrylate, 2-hydroxyethyleneglycol (meth)acrylate, and 2-hydroxypropyleneglycol (meth)acrylate, but is not limited thereto.

According to an exemplary embodiment of the present invention, the carboxyl group-containing (meth)acrylate-based monomer may be one or more monomers selected from the group consisting of acrylic acid, methacrylic acid, 2-ethyl acrylic acid, 2-(meth)acryloyloxy acetic acid, 3-(meth)acryloyloxy propionic acid, 4-(meth)acryloyloxy butyric acid, and acrylic acid dimer, but is not limited thereto.

According to an exemplary embodiment of the present invention, the nitrogen-containing (meth)acrylate-based monomer may be one or more monomers selected from the group consisting of 2-isocyanatoethyl (meth)acrylate, 3-isocyanatopropyl (meth) acrylate, and 4-isocyanatobutyl (meth)acrylate, but is not limited thereto.

According to an exemplary embodiment of the present invention, the (meth)acrylate-based monomer may further include at least one of an unsaturated alkyl group-containing (meth)acrylate-based monomer and an unsaturated cycloalkyl group-containing (meth)acrylate-based monomer.

According to an exemplary embodiment of the present invention, when the (meth)acrylate-based monomer includes all of an alkyl group-containing (meth)acrylate-based monomer, a cycloalkyl group-containing (meth)acrylate-based monomer, and a polar functional group-containing (meth)acrylate-based monomer, a content of the alkyl group-containing (meth)acrylate-based monomer may be 40 parts by weight or more to 60 parts by weight or less based on 100 parts by weight of the total sum of the monomers, a content of the cycloalkyl group-containing (meth)acrylate-based monomer may be 20 parts by weight or more to 40 parts by weight or less based on 100 parts by weight of the total sum of the monomers, and a content of the polar functional group-containing (meth)acrylate-based monomer may be 10 parts by weight or more to 30 parts by weight or less based on 100 parts by weight of the total sum of the monomers.

When the alkyl group-containing (meth)acrylate-based monomer is mixed within the above content range, a low molecular weight acrylic resin in which an acrylic skeleton structure is sufficiently formed may be prepared.

When the cycloalkyl group-containing (meth)acrylate-based monomer is mixed within the above content range, a low molecular weight acrylic resin with improved initial adhesive strength may be prepared.

When the polar functional group-containing (meth)acrylate-based monomer is mixed within the above content range, it is possible to prevent a problem in that the low molecular weight acrylic resin is overcured, and it is possible to improve the reworkability by appropriately adjusting adhesion strength of an adhesive film, which is prepared by using the acrylic adhesive, to an adherend.

According to an exemplary embodiment of the present invention, the photoreactive functional group-containing (meth)acrylate-based monomer may be included as a monomer unit of the low molecular weight acrylic resin, thereby imparting a photoreactive functional group to the low molecular weight acrylic resin.

According to an exemplary embodiment of the present invention, the photoreactive functional group-containing (meth)acrylate-based monomer may include at least one photoreactive functional group of an acetophenone group; a benzoin group; an acylphosphine oxide group; a titanocene group; a benzophenone group; an anthracene group; and a thioxanthone group. Specifically, the photoreactive functional group-containing (meth)acrylate-based monomer may be a benzophenone group-containing (meth)acrylate monomer, more specifically, a benzophenone (meth)acrylate monomer.

According to an exemplary embodiment of the present invention, the photoreactive functional group-containing (meth)acrylate-based monomer may be included in the mixture in an amount of 0.1 part by weight or more to 10 parts by weight or less, 1 part by weight or more to 5 parts by weight or less, or 1 part by weight or more to 3 parts by weight or less based on 100 parts by weight of the (meth) acrylate-based monomer.

When the photoreactive functional group-containing (meth)acrylate-based monomer is included in the mixture within the above range, an adhesive including the low molecular weight acrylic resin may be additionally cured without a curing agent, thereby preparing a clear adhesive film having a low haze value.

Meanwhile, when the content of the photoreactive functional group-containing (meth)acrylate-based monomer is less than the above range, the additional photocuring does not smoothly proceed, so that there is a problem in that the durability of the adhesive film prepared from the adhesive including the low molecular weight acrylic resin deteriorates, and when the content thereof exceeds the above range, there are problems in that the rate of the polymerization reaction into the low molecular weight acrylic resin becomes slow, and it is difficult to apply the prepared low molecular weight acrylic resin to an optical adhesive due to yellowing of the prepared low molecular weight acrylic resin.

According to an exemplary embodiment of the present invention, when a chain transfer agent is included during solution photopolymerization, a low molecular weight acrylic resin having a molecular weight within a desired range may be prepared.

According to an exemplary embodiment of the present invention, the chain transfer agent may be included in the mixture in an amount of 0.5 part by weight or more to 10 parts by weight or less or 1 part by weight or more to 5 parts by weight or less based on 100 parts by weight of the (meth)acrylate-based monomer. Within the content range of the chain transfer agent, the prepared low molecular weight acrylic resin may have a molecular weight within a desired range.

According to an exemplary embodiment of the present invention, the chain transfer agent may be a mercaptan-based compound, that is, a compound including a thiol group (—SH). Further, the chain transfer agent may be freely selected among those known in the art as long as the chain transfer agent is a compound including a thiol group.

According to an exemplary embodiment of the present invention, the mixture may further include a photopolymerization initiator. When the mixture further includes a photopolymerization initiator, the residual photopolymerization initiator may be removed together during the removal of the solvent and the residual chain transfer agent.

According to an exemplary embodiment of the present invention, as the photopolymerization initiator, it is possible to use a publicly-known photopolymerization initiator such as benzoin-based, hydroxyl ketone-based, aminoketone-based, and phosphine oxide-based photopolymerization initiators. Specifically, the photopolymerization initiator may be one or more selected from the group consisting of benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2(hydroxy-2-propyl)ketone, benzophenone, p-phenylbenzophenone, 4,4'-diethylamino benzophenone dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenonedimethyl ketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, but is not limited in type.

Further, the content of the photopolymerization initiator is not particularly limited, and may be appropriately adjusted according to the weight average molecular weight range of a low molecular weight acrylic resin to be required.

According to an exemplary embodiment of the present invention, since the mixture includes a solvent and the low molecular weight acrylic resin is prepared through solution photopolymerization, heat generation caused by a polymerization reaction into the low molecular weight acrylic resin may be easily controlled.

According to an exemplary embodiment of the present invention, the solvent may be at least one solvent of an ester-based solvent, an ether-based solvent, a ketone-based solvent, an aromatic hydrocarbon-based solvent, a carbonate-based solvent, an alcoholic solvent, a nitrile-based solvent, an amide-based solvent, a dioxolane-based solvent, and a sulfolane-based solvent. Specifically, the solvent may be one or more selected from the group consisting of methyl acetate, ethyl acetate, γ-butyrolactone, ε-caprolactone, dibutyl ether, tetrahydrofuran, cyclohexanone, benzene, fluorobenzene, dimethylcarbonate (DMC), diethylcarbonate (DEC), methylethylcarbonate (MEC), ethylmethylcarbonate (EMC), ethylene carbonate (EC), propylene carbonate (PC), ethyl alcohol, isopropyl alcohol, dimethylformamide, and 1,3-dioxolane, but is not limited in type.

According to an exemplary embodiment of the present invention, the solvent may be included in the mixture in an amount of 15 parts by weight or more to 25 parts by weight or less based on 100 parts by weight of the (meth)acrylate-based monomer. Within the content range of the solvent, heat generation caused by the polymerization reaction may be efficiently controlled, and a low molecular weight acrylic resin having a weight average molecular weight within a desired range may be prepared.

According to an exemplary embodiment of the present invention, the low molecular weight acrylic resin is prepared by solution photopolymerization of the mixture, and the condition of the solution photopolymerization is not particularly limited.

According to an exemplary embodiment of the present invention, the low molecular weight acrylic resin may have a conversion of 90% or more to 100% or less, or 90% or more to 95% or less. That the low molecular weight acrylic resin has a conversion within the above range may mean that the content of unreacted monomer in the solution including the low molecular weight acrylic resin is minimized, and may mean that the deterioration in adhesion properties of the low molecular weight acrylic resin by the unreacted monomer is minimized.

In the present specification, the conversion of the low molecular weight acrylic resin may be defined by the following Equation 1:

$$C = A/B \times 100 \qquad \text{[Equation 1]}$$

In Equation 1, A means a weight (g) of a low molecular weight acrylic resin, B means a total weight (g) of a (meth)acrylate-based monomer and a photoreactive functional group-containing (meth)acrylate-based monomer, and C means a conversion (%).

According to an exemplary embodiment of the present invention, a solution including a low molecular weight acrylic resin prepared by solution photopolymerization of the mixture may include an unreacted monomer which fails to participate in the solution photopolymerization reaction. The unreacted monomer may be polymerized together with the low molecular weight acrylic resin when forming an adhesive film using the adhesive.

According to an exemplary embodiment of the present invention, the low molecular weight acrylic resin may have a weight average molecular weight of 5,000 g/mol or more to 40,000 g/mol or less. When the low molecular weight acrylic resin has a weight average molecular weight within the above range, physical properties such as weatherability and light resistance may be excellent, and it is possible to sufficiently improve the adhesive strength of a film prepared by using an adhesive including the low molecular weight acrylic resin.

The method of preparing an acrylic adhesive composition according to an exemplary embodiment of the present invention includes removing a solvent and a residual chain transfer agent by mixing the solution including the low molecular weight acrylic resin with a monomer for dilution, and then reducing pressure.

According to an exemplary embodiment of the present invention, the solvent and the residual chain transfer agent included in the solution may be evaporated and removed through the process of reducing pressure.

Accordingly, it is possible to minimize deterioration in adhesion properties of the acrylic adhesive caused by the solvent and the residual chain transfer agent.

According to an exemplary embodiment of the present invention, as the solution including the low molecular weight acrylic resin is mixed with the monomer for dilution, it is possible to prevent a problem in that the viscosity of a solution including the polymerized low molecular weight acrylic resin becomes so high that it is difficult to release the solution, and it is possible to easily remove the solvent and the residual chain transfer agent.

Further, the monomer for dilution may be the same as the (meth)acrylate-based monomer, but is not limited in type.

According to an exemplary embodiment of the present invention, the monomer for dilution is not separately removed, and subsequently, when preparing an adhesive film by using the adhesive, the monomer for dilution may be involved in the formation of the film.

According to an exemplary embodiment of the present invention, the process of reducing pressure may reduce pressure within a pressure range from atmospheric pressure (760 Torr) to 0.1 mTorr to 0.5 mTorr after mixing the solution including the low molecular weight acrylic resin with the monomer for dilution. Within the pressure range, all of the solvent, the residual chain transfer agent, and the residual photopolymerization initiator included in the solution including the low molecular weight acrylic resin may be volatilized, and particularly within the above pressure range, it is possible to prevent a problem in that the solvent boils over. Further, a method of forming the vacuum atmosphere is not particularly limited, and a publicly-known method of reducing pressure may be used.

An exemplary embodiment of the present invention provides an adhesive film prepared by using the acrylic adhesive prepared by the preparation method, specifically, a cured product of the acrylic adhesive, and more specifically, an adhesive film including a cured product of a composition including the acrylic adhesive. Further, the composition including the acrylic adhesive may further include a (meth)acrylate-based monomer. Here, the (meth)acrylate-based monomer may be the same as the above-described (meth)acrylate-based monomer.

According to an exemplary embodiment of the present invention, the adhesive film may be prepared by photocuring the adhesive. The photocuring method is not particularly limited, and may be carried out according to a photocuring method known in the art. As an example, the adhesive film may be prepared by irradiating the adhesive with UV rays using high-pressure mercury or high-pressure halogen as a light source.

According to an exemplary embodiment of the present invention, the gel content of the adhesive film may be 30% or more to 60% or less, or 40% or more to 50% or less. Within the above gel content range of the adhesive film, handling of the adhesive film may be facilitated.

Here, the gel content of the adhesive film means a content of a solid phase material cured in the adhesive film.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

A mixture including 2 parts by weight of benzophenone methacrylate (BPMA), 0.05 part by weight of a photopolymerization initiator (Irgacure 184, CIBA), 1.2 parts by weight of a chain transfer agent (isooctyl thioglycolate), and 20 parts by weight of a solvent (ethyl acetate) based on 100 parts by weight of a total sum of 50 parts by weight of ethylhexyl acrylate (2-EHA), 30 parts by weight of isobornyl acrylate (IBOA), and 20 parts by weight of hydroxyethyl acrylate (HEA) was prepared.

The mixture was subjected to solution photopolymerization by irradiating the mixture with metal halide light at a temperature of 25° C. for about 3 hours, thereby preparing a solution including a low molecular weight acrylic resin. In this case, a conversion rate of the obtained low molecular weight acrylic resin was about 95%.

After the solution including the low molecular weight acrylic resin was mixed with a monomer for dilution (isobornyl acrylate; IBOA), the pressure was reduced from atmospheric pressure (about 760 Torr) to about 0.1 mTorr by using a vacuum pump, and then the evaporated solvent, the residual photopolymerization initiator, and the residual chain transfer agent were removed by using a condenser, thereby preparing an acrylic adhesive.

Example 2

An acrylic adhesive was prepared in the same manner as in Example 1, except that the content of BPMA was adjusted to 1 part by weight based on 100 parts by weight of the total sum of ethylhexyl acrylate (2-EHA), isobornyl acrylate (IBOA), and hydroxyethyl acrylate (HEA). In this case, a conversion rate of the obtained low molecular weight acrylic resin was about 95%.

Comparative Example 1

An acrylic adhesive was prepared in the same manner as in Example 1, except that the content of BPMA was adjusted to 0.001 part by weight based on 100 parts by weight of the total sum of ethylhexyl acrylate (2-EHA), isobornyl acrylate (IBOA), and hydroxyethyl acrylate (HEA). In this case, a conversion rate of the obtained low molecular weight acrylic resin was about 95%.

Comparative Example 2

A solution including an acrylic resin was prepared in the same manner as in Example 1, except that the content of BPMA was adjusted to 15 parts by weight based on 100 parts by weight of the total sum of ethylhexyl acrylate (2-EHA), isobornyl acrylate (IBOA), and hydroxyethyl acrylate (HEA). In this case, a conversion rate of the obtained low molecular weight acrylic resin was about 95%.

Comparative Example 3

A mixture including 2 parts by weight of benzophenone methacrylate (BPMA), 0.05 part by weight of a photopolymerization initiator (Irgacure 184, CIBA), and 1.2 parts by weight of a chain transfer agent (n-dodecylmercaptan) based on 100 parts by weight of a total sum of 50 parts by weight of ethylhexyl acrylate (2-EHA), 30 parts by weight of isobornyl acrylate (IBOA), and 20 parts by weight of hydroxyethyl acrylate (HEA) was prepared.

An acrylic adhesive was prepared in the same manner as in Example 1, except that the mixture was subjected to bulk photopolymerization by irradiating the mixture with metal halide light at a temperature of 25° C. for about 3 hours, thereby preparing an acrylic resin. In this case, the temperature of the acrylic adhesive was increased up to 110° C. In this case, a conversion rate of the obtained acrylic resin was about 95%.

Comparative Example 4

A mixture including 2 parts by weight of benzophenone methacrylate (BPMA), 0.03 part by weight of a thermal polymerization initiator (azoisobutyronitrile; AIBN), and 1.2 parts by weight of a chain transfer agent (n-dodecylmercaptan) based on 100 parts by weight of a total sum of 50 parts by weight of ethylhexyl acrylate (2-EHA), 30 parts by weight of isobornyl acrylate (IBOA), and 20 parts by weight of hydroxyethyl acrylate (HEA) was prepared.

An acrylic adhesive was prepared in the same manner as in Example 1, except that the mixture was subjected to bulk heat polymerization by subjecting the mixture to a heat treatment at a temperature of 60° C. for about 3 hours, thereby preparing an acrylic resin. In this case, the temperature of the acrylic resin was increased up to 110° C. In this case, a conversion rate of the obtained acrylic resin was about 95%.

Comparative Example 5

An acrylic resin was prepared in the same manner as in Comparative Example 3, except that the process of reducing pressure was not carried out. In this case, a conversion rate of the obtained acrylic resin was about 95%.

Comparative Example 6

An acrylic resin was prepared in the same manner as in Comparative Example 5, except that 1.2 parts by weight of isooctyl thioglycolate was used as a chain transfer agent. In this case, a conversion rate of the obtained acrylic resin was about 95%.

Comparative Example 7

An acrylic resin was prepared in the same manner as in Comparative Example 4, except that the mixture prepared in Comparative Example 4 was subjected to a heat treatment at a temperature of 60° C. for about 5 hours, and was not subjected to a pressure reducing treatment. In this case, the temperature of the acrylic resin was increased up to 110° C. In this case, a conversion rate of the obtained acrylic resin was about 95%.

Comparative Example 8

An acrylic resin was prepared in the same manner as in Example 1, except that, a mixture was prepared by using 0.03 part by weight of a thermal polymerization initiator (AIBN) instead of the photopolymerization initiator in Example 1, and then the mixture was subjected to solution thermal polymerization by subjecting the mixture to a heat treatment at a temperature of 60° C. for about 8 hours, and was not subjected to a pressure reducing treatment. In this case, a conversion rate of the obtained acrylic resin was about 95%.

[Experimental Example 1] Identification of Presence of Additional Photocuring

Adhesive films were prepared by photocuring the acrylic adhesives prepared in Examples 1 and 2 and Comparative Examples 1 and 2. The gel contents of the adhesive films before and after additional curing through irradiation of the adhesive films with black light were calculated by the following Equation 2, and are shown in the following Table 1.

$$\text{Gel Content (\%)} = (Z-Y)/X \times 100 \quad \text{[Equation 2]}$$

In Equation 2, X is a weight (g) of a sample cut into a size of 5 cm×5 cm, Y means a weight of a network made of steel cut into a size of 14 cm×14 cm, and Z means a weight measured after drying a network made of steel in which a residue of the sample was remaining under a constant temperature condition of 100° C. for 2 hours after the sample contained in a polyethylene bottle was swollen with ethyl acetate at a temperature of 25° C. for 24 hours, and filtered with the network made of steel.

TABLE 1

|  | Before additional curing (%) | After additional curing (%) |
|---|---|---|
| Example 1 | 43 | 73 |
| Example 2 | 45 | 65 |
| Comparative Example 1 | 42 | 43 |
| Comparative Example 2 | 90 | 90 |

In the case of the adhesive films using the acrylic adhesives according to Examples 1 and 2 in which the mixture including BPMA, which is one of the photoreactive functional group-containing (meth)acrylate monomers, within the range according to an exemplary embodiment of the present invention was used, it was confirmed that the gel content before and after the additional curing was significantly increased. Further, in the case of the adhesive film using the acrylic adhesive according to Comparative Example 1 in which the mixture including BPMA in an amount less than the above range was used, it was confirmed that there was little change in gel content before and after the additional curing. Furthermore, in the case of Comparative Example 2 in which the mixture including BPMA in an amount more than the above range was used, it was confirmed that it is difficult to apply the adhesive film to an optical adhesive because the gel content was about 90%, which is very high, and there was little change in gel content before and after the additional curing.

As a result, it can be seen that an adhesive film prepared from an acrylic adhesive including a low molecular weight acrylic resin prepared by using a photoreactive functional group-containing (meth)acrylate monomer within the range according to an exemplary embodiment of the present invention can be additionally photocured without an additional curing agent, and sufficient durability can be secured through the additional photocuring.

[Experimental Example 2]—Measurement of Weight Average Molecular Weight

The weight average molecular weights of the acrylic resins prepared according to Example 1 and Comparative Examples 3 to 8 were measured, and are shown in the following Table 2.

Specifically, a sample specimen in which a concentration of an acrylic resin was 1 wt % was prepared by putting tetrahydrofuran (THF) and a compound into a 1-ml glass bottle, a standard specimen (polystyrene) and the sample specimen were filtered through a filter (pore size of 0.45 μm), and then the elution time of the sample specimen was compared with the calibration curve of the standard specimen by injecting the specimens into a GPC injector, thereby measuring the weight average molecular weight of the acrylic resin. In this case, Infinity II 1260 (manufactured by Agilient Inc.) was used as a measuring apparatus, and the flow rate and the column temperature were set to 1.00 mL/min and 40.0° C., respectively.

[Experimental Example 3]—Measurement of Content of Residual Chain Transfer Agent The acrylic resins according to Example 1 and Comparative Examples 3 to 8 were analyzed by using a gas chromatography apparatus (GCMS; AGILENTS tech), and the content of a thiol group (—SH) detected through the apparatus is shown in the following Table 2.

TABLE 2

|  | Weight average molecular weight (g/mol) | Amount of thiol group detected (ppm) |
| --- | --- | --- |
| Example 1 | 31,000 | 0.01 |
| Comparative Example 3 | 28,000 | 100 |
| Comparative Example 4 | 25,000 | 100 |
| Comparative Example 5 | 29,000 | Exceeding 1,000 |
| Comparative Example 6 | 31,000 | Exceeding 1,000 |
| Comparative Example 7 | 25,000 | Exceeding 1,000 |
| Comparative Example 8 | 26,000 | Exceeding 1,000 |

According to Table 2, it was confirmed that in the acrylic adhesives prepared according to Example 1 and Comparative Examples 3 and 4 in which the pressure reducing treatment was performed, the thiol group in an extremely small amount of 0.01 ppm was detected. Meanwhile, it was confirmed that in the acrylic adhesives according to Comparative Examples 5 to 8 in which a separate process of reducing pressure was not performed, the thiol group in an amount of more than 1,000 ppm was detected. Meanwhile, in the acrylic resins according to Comparative Examples 3 and 4 which were prepared by bulk photopolymerization instead of solution photopolymerization, there were problems in that it was difficult to control heat generation during the polymerization process, and the thiol group was not sufficiently evaporated. Further, in the acrylic resin according to Comparative Example 8 which was prepared by solution thermal polymerization, the thermal polymerization initiator is activated and thus may be gelled even though the acrylic resin is subjected to a pressure reducing treatment, and in this case, it was confirmed that it is difficult to apply the acrylic resin to an optical adhesive because the solvent, the residual chain transfer agent, and the residual thermal polymerization initiator cannot be removed.

As a result, it can be seen that when a solution including a low molecular weight acrylic resin was mixed with a monomer for dilution, and then pressure was reduced, as in the preparation method according to an exemplary embodiment of the present invention, it is possible to easily remove a molecular weight adjusting agent component causing deterioration in adhesion properties of the acrylic resin.

When the above contents are summarized, it can be seen that when a mixture including a photoreactive functional group-containing (meth)acrylate-based monomer is subjected to solution photopolymerization, and then is mixed with a monomer for dilution, and then pressure is reduced, as in an exemplary embodiment of the present invention, an adhesive film with improved durability can be formed through additional photocuring, and it is possible to prepare an acrylic adhesive from which the residual component is efficiently removed.

The invention claimed is:

1. A method of preparing an acrylic adhesive, the method comprising:
preparing a mixture including a (meth)acrylate-based monomer, a photoreactive functional group-containing (meth)acrylate-based monomer, a chain transfer agent, and a solvent;
solution photopolymerizing the mixture to form a solution including an acrylic resin, wherein the acrylic resin has a weight average molecular weight of 5,000 g/mol to 40,000 g/mol;
mixing the solution including the acrylic resin with a monomer for dilution; and then reducing pressure to remove the solvent and any residual amount of the chain transfer agent from the solution including the acrylic resin with the monomer for dilution, wherein the photoreactive functional group-containing (meth)acrylate-based monomer is included in an amount of 0.1 part by weight or more to 10 parts by weight or less based on 100 parts by weight of the (meth)acrylate-based monomer.

2. The method of claim 1, wherein the photoreactive functional group-containing (meth)acrylate-based monomer comprises at least one photoreactive functional group of an acetophenone group, a benzoin group, an acylphosphine oxide group, a titanocene group, a benzophenone group, an anthracene group, or a thioxanthone group.

3. The method of claim 1, wherein the (meth)acrylate-based monomer comprises at least one of an alkyl group-containing (meth)acrylate-based monomer, a cycloalkyl group-containing (meth)acrylate-based monomer, or a polar functional group-containing (meth)acrylate-based monomer.

4. The method of claim 3, wherein the (meth)acrylate-based monomer comprises the alkyl group-containing (meth)acrylate-based monomer, the cycloalkyl group-containing (meth)acrylate-based monomer, and the polar functional group-containing (meth)acrylate-based monomer.

5. The method of claim 4, wherein the (meth)acrylate-based monomer comprises:

the alkyl group-containing (meth)acrylate-based monomer in an amount of 40 parts by weight to 60 parts by weight based on 100 parts by weight of a total sum of the (meth)acrylate-based monomer, the cycloalkyl group-containing (meth)acrylate-based monomer in an amount of 20 parts by weight to 40 parts by weight based on 100 parts by weight of the total sum of the (meth)acrylate-based monomer, and the polar functional group-containing (meth)acrylate-based monomer in an amount of 10 parts by weight to 30 parts by weight based on 100 parts by weight of the total sum of the (meth)acrylate-based monomer.

6. The method of claim 1, wherein the chain transfer agent is a compound including a thiol group.

7. The method of claim 1, wherein the chain transfer agent is included in an amount of 0.5 part by weight or more to 10 parts by weight or less based on 100 parts by weight of the (meth)acrylate-based monomer.

8. The method of claim 1, wherein the solvent is included in an amount of 15 parts by weight or more to 25 parts by weight or less based on 100 parts by weight of the (meth)acrylate-based monomer.

9. The method of claim 1, wherein a conversion rate of the acrylic resin is 90% to 100%.

10. The method of claim 1, wherein the pressure of the solution is reduced from atmospheric pressure to 0.1 mTorr to 0.5 mr-Torr to remove the solvent and the chain transfer agent.

* * * * *